US007099983B2

(12) United States Patent
Emerson et al.

(10) Patent No.: US 7,099,983 B2
(45) Date of Patent: Aug. 29, 2006

(54) MULTI-CORE COMMUNICATIONS MODULE, DATA COMMUNICATIONS SYSTEM INCORPORATING A MULTI-CORE COMMUNICATIONS MODULE, AND DATA COMMUNICATIONS PROCESS

(75) Inventors: Steven M. Emerson, Chanhassen, MN (US); Gregory F. Hammitt, Eagan, MN (US); Steven G. Kopacek, Maple Grove, MN (US)

(73) Assignee: LSI Logic Corporation, Milpitas, CA (US)

( * ) Notice: Subject to any disclaimer, the term of this patent is extended or adjusted under 35 U.S.C. 154(b) by 326 days.

(21) Appl. No.: 10/303,589

(22) Filed: Nov. 25, 2002

(65) Prior Publication Data

US 2004/0103230 A1 May 27, 2004

(51) Int. Cl.
*G06F 13/36* (2006.01)
(52) U.S. Cl. .................. 710/306; 710/56; 710/315; 370/402
(58) Field of Classification Search ............... 710/315, 710/317, 307, 56, 306; 370/402
See application file for complete search history.

(56) References Cited

U.S. PATENT DOCUMENTS

| | | | | | |
|---|---|---|---|---|---|
| 5,113,500 | A | * | 5/1992 | Talbott et al. ............... 710/305 |
| 5,175,824 | A | * | 12/1992 | Soderbery et al. .......... 710/317 |
| 5,179,669 | A | * | 1/1993 | Peters ........................ 710/317 |
| 5,363,484 | A | * | 11/1994 | Desnoyers et al. ......... 709/212 |
| 5,440,698 | A | * | 8/1995 | Sindhu et al. ............... 709/225 |
| 5,448,565 | A | * | 9/1995 | Chang et al. ................ 370/402 |
| 5,448,701 | A | * | 9/1995 | Metz et al. .................. 710/113 |
| 5,559,970 | A | * | 9/1996 | Sharma ....................... 710/317 |
| 5,835,738 | A | * | 11/1998 | Blackledge, Jr. et al. ... 710/307 |
| 5,859,988 | A | * | 1/1999 | Ajanovic et al. ........... 710/306 |
| 5,909,559 | A | * | 6/1999 | So .............................. 710/307 |
| 5,987,554 | A | * | 11/1999 | Liu et al. .................... 710/310 |
| 6,032,205 | A | * | 2/2000 | Ogimoto et al. ............. 710/33 |
| 6,108,725 | A | * | 8/2000 | Chatter ........................ 710/56 |
| 6,618,782 | B1 | * | 9/2003 | Gulick et al. ............... 710/305 |
| 6,628,662 | B1 | * | 9/2003 | Blackmon et al. .......... 370/447 |
| 6,678,801 | B1 | * | 1/2004 | Greim et al. ................ 711/148 |
| 6,715,023 | B1 | * | 3/2004 | Abu-Lebdeh et al. ....... 710/317 |

OTHER PUBLICATIONS

Anders Larsson, Erik Larsson, Petru Eles, and Zebo Peng, "Buffer and Controller Minimisation fro Time-Contstrained Testing of System-On-Chip", 2003, IEEE. 18th IEEE International Symposium on Defect and Fault Tolerance in VLSI.*
"AMBA™ Specification (Rev. 2.0)", ARM Limited, Cambridge, England, pp. ii-vi and 3-1-3-58 (May 13, 1999).

* cited by examiner

*Primary Examiner*—Glenn A. Atrve
*Assistant Examiner*—Justin King
(74) *Attorney, Agent, or Firm*—Westman, Champlin & Kelly (57) ABSTRACT

A communications module for a data communications system having a plurality of data processors comprises a plurality of ports, each coupled to a respective one of the data processors. An address table associates addresses of a memory space to addresses of the data processors. The memory space may include addressable FIFOs, SRAM memory and/or flag registers. In the case of FIFOs, a counter coupled to the FIFO supplies a flag or ready signal indicating the not-full or not-empty status of the respective FIFO, which is supplied to a master device that is writing data to the FIFO or that is reading data from the FIFO so that the writing master device will write only when the FIFO is not full and the reading master device will read only when the FIFO is not empty.

20 Claims, 5 Drawing Sheets

MULTI-CORE COMMUNICATIONS MODULE, DATA COMMUNICATIONS SYSTEM INCORPORATING A MULTI-CORE COMMUNICATIONS MODULE, AND DATA COMMUNICATIONS PROCESS

FIELD OF THE INVENTION

This invention relates to data communications, and particularly to data communications modules that support data communications between subsystems in multi-core system-on-chips, as well as to systems employing such modules and corresponding data communications processes.

BACKGROUND OF THE INVENTION

Data buses are used in integrated circuits (ICs) to transfer data between master devices, such as user-controlled microprocessors, and slave devices controlling peripheral devices, such as memories and the like. Such an IC is often referred to as a system-on-chip (SOC). Some SOCs support multiple processors and are referred to as multi-core SOCs.

In many cases, the processors of a multi-core SOC either do not communicate with each other or use a single, very simple communications mechanism. However, in some cases a multi-core SOC might be configured with two or more processors that either operate in different formats or use a variety of communications mechanisms with each other. In such cases, the SOC is designed to support the requirements of each processor to be coupled by the SOC. For example, if the processors require different hardware resources, or use them in diverse manners, the SOC must be designed to accommodate all such requirements and uses. Hence, the SOC is designed to accommodate various communications hardware requirements, such as the number and depth of first-in first-out memories (FIFOs), flag and interrupt registers and centralized random-access memories (RAMs), as well as other requirements such as bus protocols, data formats (including endianess), datapath widths, bus frequencies and synchronous/asynchronous communication, to name a few.

Consequently, multi-core SOCs are designed and fabricated for selected hardware and software requirements of the processors, and are not easily adapted to other processor hardware or software requirements. The multi-core SOCs are not easily reconfigurable or programmable to accept processors with different requirements.

SUMMARY OF THE INVENTION

The present invention is directed to a user-configurable and programmable communications module for a multi-processor system, and particularly for a multi-core SOC, that permits communication between processors having different data and/or address formats or use different communications mechanisms. More particularly, the present invention is directed to a communications module that acts as a slave device for each of a plurality of buses so that processors on one bus can exchange messages, share data, and signal events with processors on other buses. The communications module includes a memory addressable in the address format of each bus to write data into the memory from each bus, and to read data to each bus in response to commands from a bus.

In one embodiment, a communications module is provided for a data communications system having a plurality of data processors. The module comprises a plurality of ports, each arranged to be coupled to at least one of the respective data processors. A memory device has a plurality of locations for storing data that are addressable by the data processors. A multiplexer transmits data between an addressed location in the memory and a respective data processor.

In some embodiments, the memory device comprises a plurality of addressable FIFOs, and an address table associated with each of the FIFOs associates addresses of the respective FIFO to addresses of the master devices. A counter coupled to each FIFO is responsive to the FIFO contents to supply a flag or ready signal indicating the not-full or not-empty status of the respective FIFO. The flag or ready signal is supplied to a data processor that is writing data to the FIFO or that is reading data from the FIFO so that the writing data processor will write only when the FIFO is not full and the reading data processor will read only when the FIFO is not empty.

In some embodiments, the module includes an arbiter for arbitrating access to the memory device by the data communications buses.

In other embodiments, the data processors are master devices coupled to respective data buses. Each bus couples a plurality of master devices to a plurality of slave devices so that each master device can transfer data with a slave device via the respective data communications bus. The communications module is coupled to each bus in a manner similar to a slave device.

In yet other embodiments, data are transferred between first and second data processors operating in incompatible formats. One data processor transmits data to a communications module using its native format. The data are stored in the communications module, and the other data processor is operated to receive the data from the module device using its native format. The first data processor is operated to transmit a first address in a first format to the communications module. The communications module associates the first address to a second address that identifies an addressable location in the communications module, where the data are stored. That address is associated to a third address in a second format, and the second data processor is operated to transmit the third address to the communications module. The module is response to the third address to transmit data from the location identified by the second address to the second data processor.

DETAILED DESCRIPTION OF THE PREFERRED EMBODIMENTS

Figure 1:
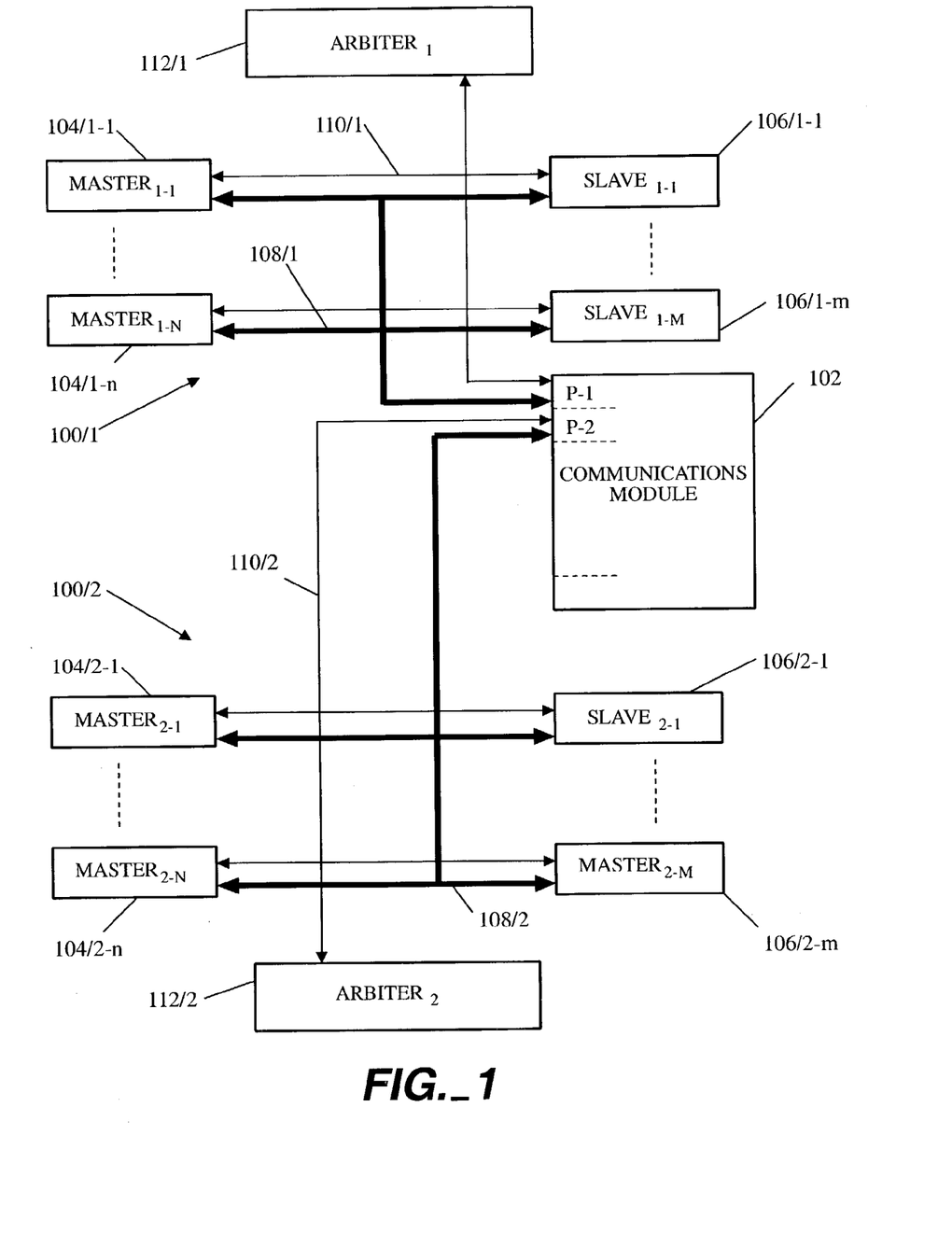
FIG. 1 is a block diagram of a multi-bus system employing a communications module according to an embodiment of the present invention.

FIG. 1 is a block diagram illustrating a plurality of buses 100/1, 100/2, etc. coupled to a communications module 102, such as a multi-core communications module. Bus system 100/1 includes a plurality of master devices 104/1-1 . . . 104/1-n and a plurality of slave devices 106/1-1 . . . 106/1-m. A data bus 108/1 couples the master devices 104/1 to the slave devices 106/1 as well as to a first port P-1 of module 102. A control bus 110/1 couples each of the master devices 104/1 to each of the slave devices 106/1, port P-1 of module 102, and to arbiter 112/1 of bus system 101/1.

Similarly, bus system 100/2 includes a plurality of master devices 104/2-1 . . . 104/2-n and a plurality of slave devices 106/2-1 . . . 106/2-m. A data bus 108/2 couples the master devices 104/2 to the slave devices 106/2 as well as to a second port P-2 of module 102. Control bus 110/2 couples each of the master devices 104/2 to each of the slave devices 106/2, port P-2 of module 102, and to arbiter 112/2 of bus system 100/2.

Bus systems 100 are data bus systems that transfer data between master devices 104 and slave devices 106 under control of an arbiter 112. One example of a bus system 100 is an Advanced High-performance Bus (AHB) based on a design from ARM Limited of Cambridge, England. The AHB bus is a form of an Advanced Microcontroller Bus Architecture (AMBA) bus that provides high performance, high clock frequency data transfer between multiple bus master devices and multiple bus slave devices through use of an arbiter. The AHB bus is particularly useful in integrated circuit chips, including single chip processors, to couple processors to on-chip memories and to off-chip external memory interfaces.

The AHB bus is a synchronous pipelined bus that operates in two phases, a command phase followed by a data transfer phase. A master device 104 initiates the command phase, such as by instructing a slave device 106 that the master device desires to write data to the slave device's memory or by instructing the slave device that the master device desires to read data from the slave device's memory. When slave device 106 is ready to receive data for storage, or is ready to send recovered data to the master device, it notifies arbiter 112 and master device 104 it is ready to receive or send data. The data transfer is then performed.

Depending on the AHB bus configuration, the data transfer is ordinarily performed on a 32- or 64-bit data bus capable of transferring a plurality of 8-bit bytes of data (4 bytes, in the case of 32-bit buses and 8 bytes in the case of 64-bit buses). Control signals that define the nature and format of the data transfer are transferred between the master and slave devices and the arbiter via control lines. A more detailed description of the AHB bus design may be found in *AMBA Specification* published by ARM Limited (1999), Version 2.0, and particularly Chapter 3 thereof (pp. 3-1 to 3-58), incorporated herein by reference.

There are multiple configurations of the AHB bus design, each with different formats. Some AHB buses employ 32-bit data buses while others employ 64-bit buses; some AHB buses employ a "big endian" address format, while others employ a "little endian" address format. AHB buses are not ordinarily able to handle more than sixteen master devices. Moreover, a given AHB bus system 100 usually operates in a single format, such as 32- or 64-bit data transfers, with big endian or little endian address formats. Module 102 acts as an additional slave device to each bus.

Figure 2:
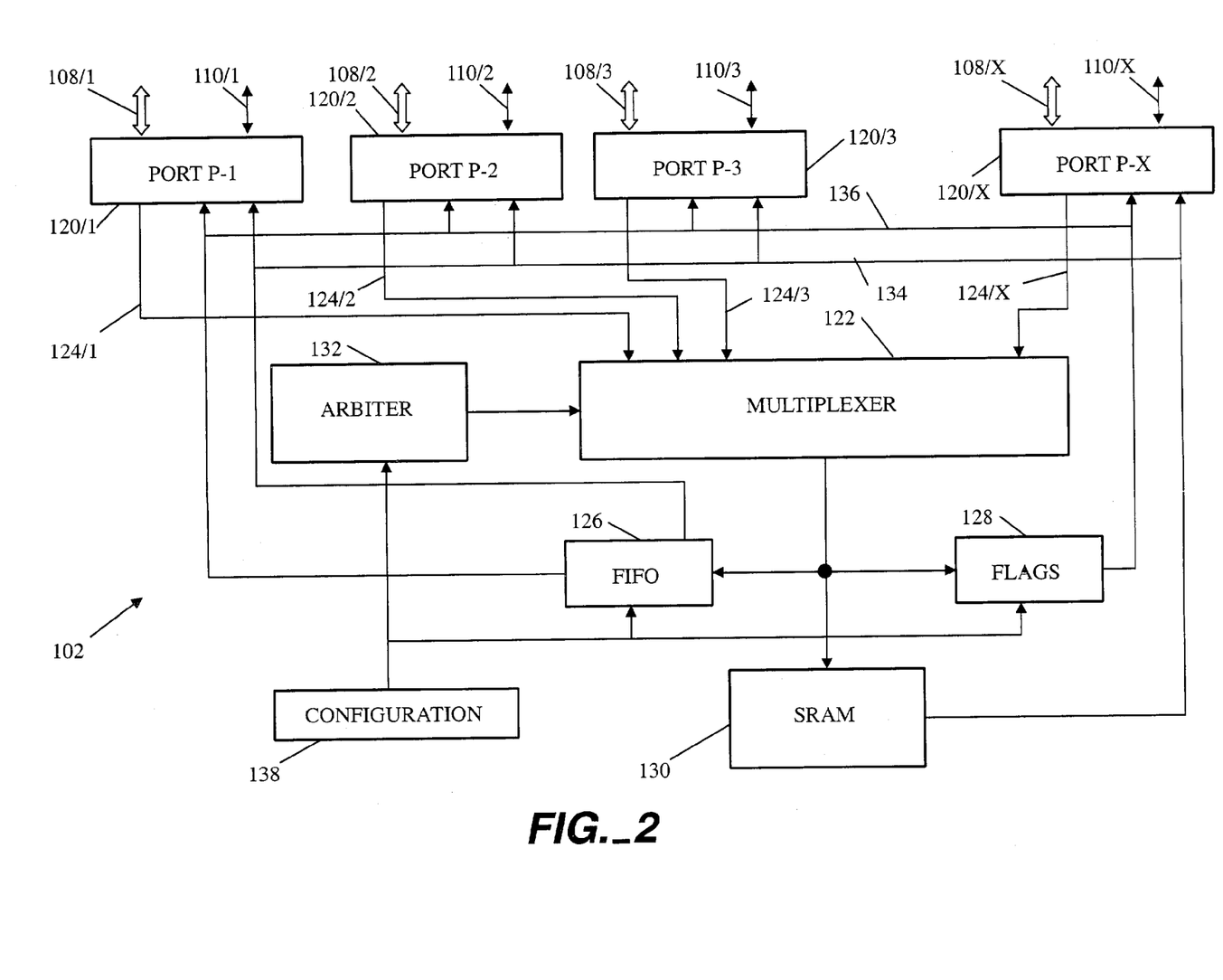
FIG. 2 is a block diagram of a communications module in accordance with the present invention for use in the multi-bus system illustrated in FIG. 1.

FIG. 2 is a block diagram of communications module 102 in accordance with an embodiment of the present invention. Module 102 includes a plurality of data ports 120/1, 120/2, 120/3, . . . 120/x each coupled to a respective one of the data buses 108/1, 108/2, 108/3, . . . 108/x and control buses 106/1, 106/2, 106/3, . . . 106/x of a respective bus system 100/1, 100/2, 100/3, . . . 100/x. Each port 120 receives data and control signals from a respective bus 108 and supplies them to multiplexer 122 via a respective bus 124/1, 124/2, . . . 124/x. Multiplexer 122 supplies data to first-in first-out (FIFO) memory 126, flag register 128 and random access memory 130 (SRAM). Arbiter 132 arbitrates use of multiplexer 122, and particularly access of ports 120 to multiplexer 122 and the memory space of FIFO 126, register 128 and SRAM 130. FIFO 126 and SRAM 130 provide data outputs via local bus 134 to each port 120, and FIFO 126 and flag register 128 provide status outputs via bus 136 to ports 120 to supply control data via control buses 106 to the respective data bus 100. Configuration register 138 is coupled to arbiter 132, FIFOs 126 and flag register 128 to provide user-adjustable configuration to the arbiter, FIFO and flag register.

Module 102 is configured to handle a plurality of data buses, and the user has the ability to change the configuration. Message passing mechanisms appear as memory mapped functions in the module memory space provided by FIFO 126 and SRAM 130. Timing of module 102 is provided locally; consequently, module 102 operates at a frequency independent of the frequency of any given data bus 100.

FIFO 126 comprises a plurality of first-in, first-out memories that are coupled to one or more of ports 120. In practice, the data storage portions of FIFO 126 may be physically part of SRAM 130. FIFO 126 includes control portions, including registers and counters described below, which may be separate from SPAN 130. FIFO 126 provides cross-coupled data communications between two ports 120 so that one port can write data to a FIFO while a second port can read data from that FIFO. A full/empty status flag is provided by the FIFO to the ports for data transfer purposes.

Upon receipt of a request from a bus 100 to conduct a transaction, the port 120 coupled to the bus determines if the address accompanying the request is to module 102. The address issued by a master device on a given bus addressees a particular slave device 106 or communications module 102. Each port is responsive to the address or address range of the module assigned for the respective bus 100. It is not necessary that module 102 has the same address or address range to each bus; instead, the address of the module may be different for each bus 100.

If the address received at a port matches that of the module for that bus, access to multiplexer 122 and the memory space of FIFO 126 and SRAM 130 is arbitrated by arbiter 132. Arbiter 132 arbitrates which port has use of multiplexer 122 and of the memory space at a given time. The arbitration protocol may be any protocol suitable for the system, including rotation of the priority among the ports or assigning specific ports a priority over others, or a combination of both. It is preferred that any given arbitration cycle prioritizes ports 120 so that if the port with the highest priority does not have any current requests, the port with the next highest priority will be serviced.

Figure 3:
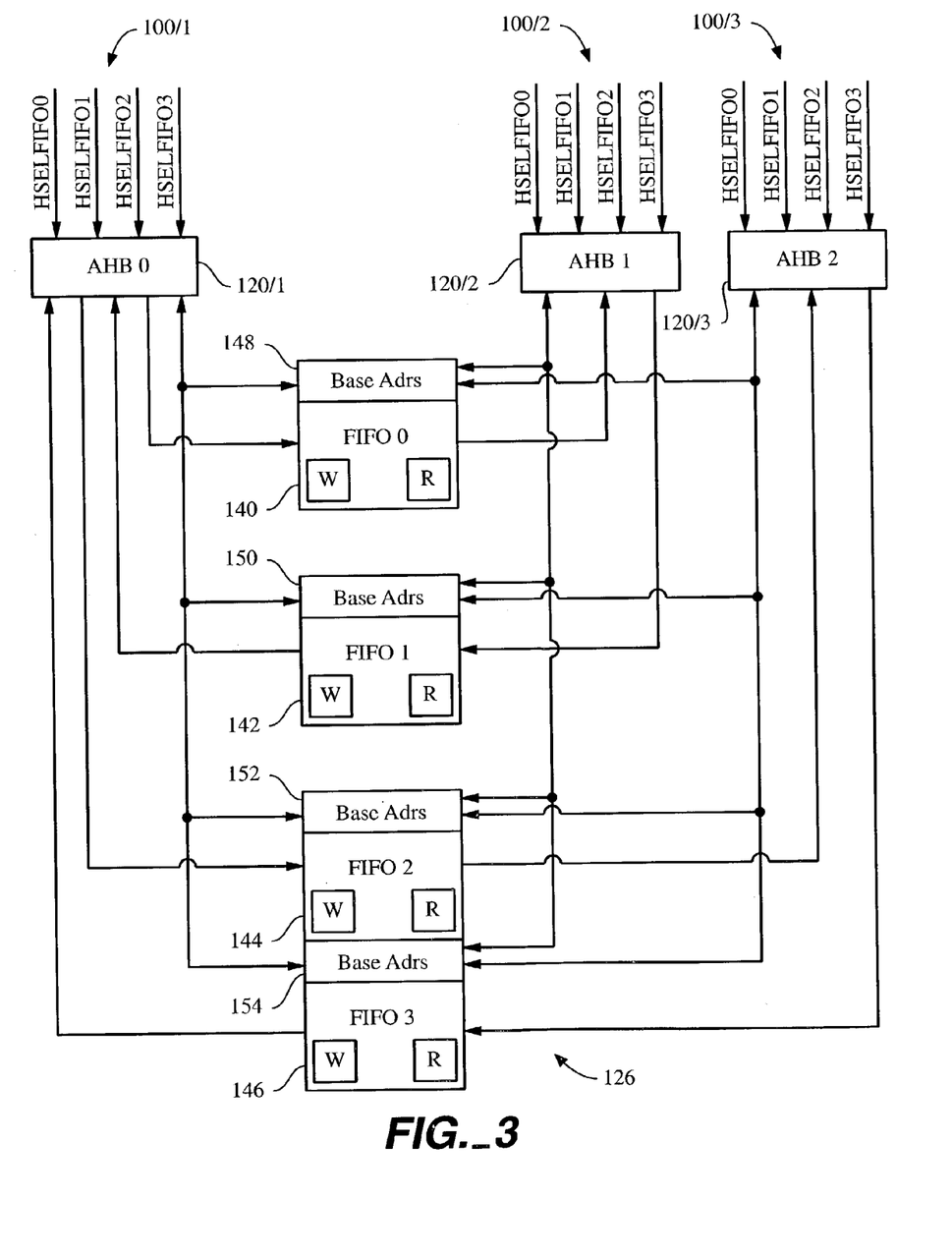
FIG. 3 is a functional block diagram of a first-in, first-out memory used in the module of FIG. 2.

FIG. 3 is a functional diagram of FIFO 126 coupled to a plurality of ports 120-1, 120-2, 120-3. FIFO 126 comprises a plurality of first-in, first-out memories 140, 142, 144, 146, each having a respective base address table 148, 150, 152, 154 that identifies the base address of the respective FIFO and a table of addresses to master devices on other buses.

A given FIFO may be dedicated for transfer of data from one specific bus to another, or among a specific group of buses. For example, if a master device 104/1, such as master device 104/1-1 (FIG. 1) on bus 100/1, desires to send a message through FIFO 126 to a master device 104/2, such as master device 104/2-1 (FIG. 1) on bus 100/2, the message is addressed to a FIFO, for example FIFO 140, and includes an address for master device 104/2-1 in the format of bus 100/1. Address 148 includes a table that identifies the address of master device 104/2-1 in the format of bus 100/2. When data are received in FIFO 140, the FIFO issues the associated address of master device 104/2-1 and a flag through port 120/2 to bus 100/2 to identify that FIFO 140 has data for transfer to master device 104/2-1 (FIG. 1). The flag issued by the FIFO represents a response signal from a slave device in a standard AHB bus and is supplied to bus arbiter 112/2 (FIG. 1) to notify the bus arbiter that module 102, acting as a slave device, is ready to transfer data to the master identified by the FIFO. Arbiter 112/2 arbitrates use of bus 100/2 to allocate use of the bus to the appropriate master device 104/2, whereupon that master device sends a request and its address for FIFO 140 in the format of bus 100/2 to module 102, now acting as a slave device to bus 100/2. FIFO 140 transfers the data, as a read function, through port 120/2 onto bus 100/2 and to the appropriate master device 104/2 thereon.

As shown in FIG. 3, select signals, identified as HSELF-IFOx, are received from each data bus 100/1, 100/2 . . . . These select signals are decoded by multiplexer 122 from the address code issued by the respective master device 104/1, 104/2 . . . to identify the address offset for the specific FIFO 140, 142, 144, 146 being addressed. The select signals are generated in the form of HSELx signals compatible to the respective AHB bus.

For example, in the context of an AHB bus, a typical address code contains 32 bits, and addresses specific locations in the slave devices of the respective bus. Typically, the most significant bits address the particular slave device and the least specific bits address the specific location in the slave device with which to transfer data.

Figure 4:
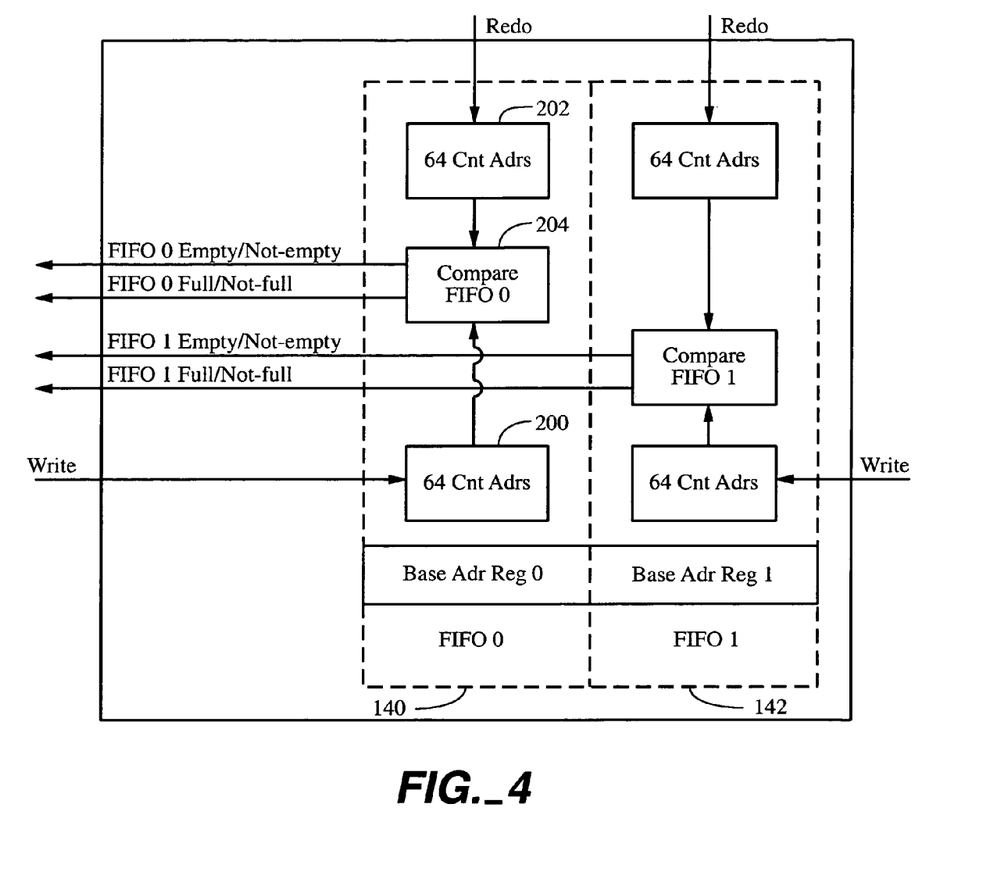
FIG. 4 is a functional block diagram of certain control aspects of the memory illustrated in FIG. 3.

FIG. 4 illustrates certain control aspects of a FIFO 140, 142, 144, 146. Each FIFO 140, 142, 144, 146 includes a write counter 200 and a read counter 202. Each time that a word or word portion (such as a byte) is written into the FIFO by a master device (such as master device 104/1-1 on bus 100/1 in the example), the count in write counter 200 is incremented by the byte count. Similarly, each time that a word is read from the FIFO (such as by master device 104/2-1 on bus 100/2 in the example), read counter 202 is incremented. Counters 200 and 202 are recirculating counters that operate to maintain an incremental count of the full and not-full, and empty and not-empty, status of the FIFO. As data are written into the FIFO by one master device (master 104/1-1), the count difference is incremented; as data are read out of the FIFO by the other master device (master 104/2-1), the count difference is decremented. Controller 204 is responsive to counters 200 and 202 to increment and decrement the count difference to provide FIFO not-full and FIFO not-empty flags to the master devices.

In the AHB environment, ready signals are issued when a selected slave device is ready to complete a transaction, such a read or write transaction. In the example, communications module 102 (FIG. 1) is acting as a slave device to both master devices 104/1-1 and 104/2-1 to write data from master device 104/1-1 and read data to master device 104/2-1. Hence, module 102, through compare 204 (FIG. 4), issues a ready signal (flag) to writing master device 104/1-1 when FIFO 140 is not full and issues a ready signal (flag) to reading master device 104/2-1 when FIFO 140 is not empty. The ready signal to the writing master device 104/1-1 enables master device 104/1-1 to transfer of data to the FIFO. Similarly, a ready signal to reading master device 104/2-1 enables master device 104/2-1 enables master device 104/2-1 to read data from the FIFO. Hence, the writing master is enabled to write into the FIFO only when the FIFO is not full, and the reading master is enabled to read data from the FIFO only when the FIFO is not empty.

SRAM 130 is a general purpose single port SRAM that is used to transfer large blocks of data between two data buses. SRAM 130 is addressed in a manner similar to any other slave device of an AHB bus. More particularly, each master device 104 on a given bus 100 addresses the SPAM using the address assigned to the module for the bus (which may be different for each bus) and the offset address for the addressable location within the SRAM to which the master device desires to access. For example, if module 102 has the address 40xx_xxxx to bus 100/1, a master device 104/1 on bus 100/1 will address the memory space of module 102 using addresses 40xx_xxxx. Within the communications module, SRAM 130 might have the address xx00_xxxx, so master device will use the address 4000_xxxx to address the SRAM, where xxxx designates a particular addressable location within the SRAM. Similarly, if module 102 has the address 30xx_xxxx to bus 100/2, a master device 104/2 on bus 100/2 will address the SRAM 130 using address 3000_xxxx.

Flag register 128 is addressed by each master device 104 in a manner similar to addressing the FIFOs. More particularly, in preferred embodiments a flag register is used for addressing from one port 120 to another port 120. The flag register may be used to indicate the presence of data in SRAM 130 so that a transmitting one master device may notify a master device on another bus that data are present for it.

Figure 5:
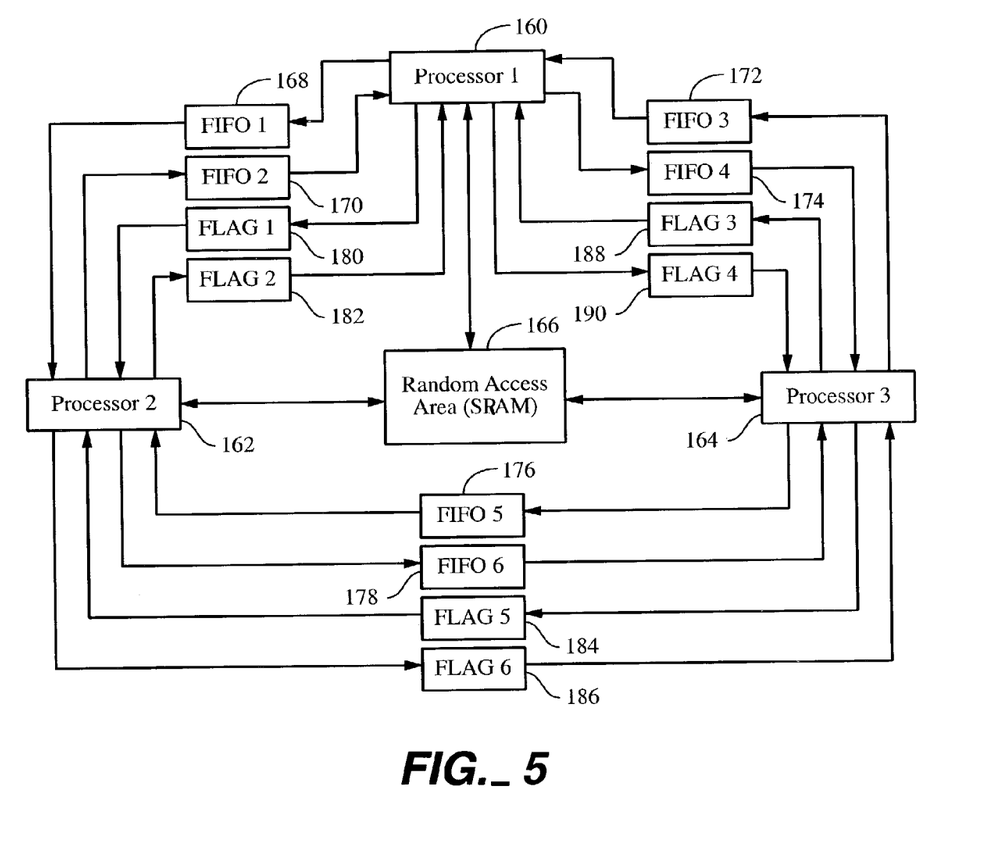
FIG. 5 is a functional block diagram illustrating operation of the multi-core communication module of the present invention.

FIG. 5 is a logical diagram illustrating the operation of multi-core communication module 102 with plural data processors, such as a processor on a bus 100. For purposes of illustration, the controls are not shown in FIG. 5. Instead, data processors 160, 162 and 164, which may represent respective buses, are operable to address locations in a random access area 166, representing SRAM memory 130 (FIG. 2), via two-way communications. Thus, each processor is able to write data to, and read data from, random access area 166 through multiplexer 122 (FIG. 2). The FIFOs are preferably arranged for one-way communication from one processor (or bus) to another processor (or bus). Thus, each processor is able to send data or messages through a FIFO and multiplexer 122 (FIG. 2) to another processor. For example, processor 160 can send data or messages through multiplexer 122 to FIFO 168 for access through multiplexer 122 to processor 162. Likewise, processor (or bus) 162 can send messages through FIFO 170 to processor (or bus) 160, processors (or buses) 160 and 164 can exchange data and messages through FIFOs 172 and 174, and processors (or buses) 162 and 164 can exchange data and messages through FIFOs 176 and 178. In a similar manner, processors (or buses) 160 and 162 can send flags to each other through flag registers 180 and 182, processors (or buses) 162 and 164 can send flags to each other through flag registers 184 and 186, and processors (or buses) 160 and 164 can send flags to each other through flag registers 188 and 190.

It will be appreciated that the address of the memory space of the SRAM, FIFO and flag register is addressed through each bus using the native format of that bus to gain access to the memory space. Master devices on other buses are notified of the presence of data for it in the memory space and access the memory space to read data in the manner of an ordinary AHB bus.

The memory can be implemented as a single ported memory which uses an arbitrated front end to identify which processor will get access. Alternatively, the memory may be implemented as a multi-port memory. Advantages of the single ported memory include that it is small, can operate at a higher frequency and can be more easily managed by hardware to prevent simultaneous access by two processors to the same memory location.

Communications module 102 is configurable (programmable) using configuration register 138. Register 138 contains user modifiable code to change the arbitration rules of arbiter 132, settings of flag register 128 and control of FIFO 126. In some embodiments, FIFOs 140, . . . may be programmed to transfer data between two or more specific buses 100. In other embodiments, a given FIFO may be configured to write data only from master devices on bus 100/1 and read data only to bus 100/2, or to transfer (write and read) data in both directions between buses 100/1 and 100/2, or to transfer data amongst any of several buses, or in any other useful configuration desired by the user.

One feature of the invention resides in the ability of module 102 to receive and issue commands in the native format of the respective bus. More particularly, address mapping for the FIFO is accomplished using the address tables. Multiplexer 122 allocates use of the module as arbitrated by arbiter 132. Communications module 102 supports various bus formats, such as big endian and little endian address formats. Preferably, module 102 itself operates in little endian format. (In the big endian format, the bytes are numbered from left to right, so the byte with the highest address is in the least significant byte position in the word. In little endian format, the bytes are numbered right to left, so the byte with the highest address is also the most significant byte of the word.)

Ports 120 of module 102 convert address formats to a specific format of the module, such as little endian. If the bus coupled to the port already executes in little endian format, the port simply passes the address. If the bus coupled to the port operates in a big endian format, the respective port is configured to convert the address format from big endian to little endian to transfer controls to the module and to convert the little endian formatted addresses to big endian for use by the bus.

Although the present invention has been described with reference to preferred embodiments, workers skilled in the art will recognize that changes may be made in form and detail without departing from the spirit and scope of the invention. Thus, while buses 100 are described as AHB buses that include arbiters, the invention may be practiced with any type of bus, whether including arbiters or not. Moreover, the multi-core communications module 102 may be used to manage data communications among plural data processors, which are not coupled to slave devices through buses, by coupling the processors directly to the ports of module 102.

What is claimed is:

1. A data communications system comprising:
   a first data communications bus, a plurality of first slave devices coupled to the first data communications bus and a plurality of first master devices coupled to the first data communications bus to initiate data communications in a first format between each respective first master device and a selected first slave device, each first master device having a respective first master device address in the first format;
   a second data communications bus, a plurality of second slave devices coupled to the second data communications bus and a plurality of second master devices coupled to the second data communications bus to initiate data communications in a second format between each respective second master device and a selected second slave device, each second master device having a respective second master device address in the second format, the first and second formats being incompatible; and
   a communications module coupled as a slave device to each of the first and second data communications buses, the communications module comprising:
      a memory device having a plurality of individually addressable locations for storing data from a transmitting first or second master device at an addressable location identified by a second address,
      an address table associated with each of the addressable locations for associating addresses of the respective addressable location to addresses of respective first and second master devices, the address table being responsive to a first address to associate the second address and a third address to the first address, the first address being the address of a receiving first or second master or slave device in the format of the transmitting first or second master device, the third address being the address of the receiving first or second master or slave device in the format of the receiving first or second master or slave device, and
      a multiplexer responsive to the third address from a receiving first or second master or slave device for transmitting data between the location in the memory device identified by the second address and the respective first or second data communications bus.

2. The data communications system of claim 1, wherein the memory device comprises a random access memory.

3. The data communications system of claim 1, wherein the memory device comprises:
   a plurality of addressable first-in, first-out (FIFO) memories.

4. The data communications system of claim 3, further comprising:
   a first counter coupled to each FIFO, the first counter being responsive to the respective FIFO not being full to provide a not-full status flag, and
   the communications module being responsive to the not-full status flag to enable at least one of the first and second master and slave devices to transmit data on a respective data communications bus to the communications module for storage in the respective FIFO.

5. The data communications system of claim 4, further comprising:
   a second counter coupled to each FIFO, the second counter being responsive to the respective FIFO not being empty to provide a not-empty status flag, and
   the communications module being responsive to the not-empty status flag to enable at least one of the first and second master and slave devices that to receive data on a respective data communications bus from the respective FIFO.

6. The data communications system of claim 3, further comprising:
   a second counter coupled to each FIFO, the second counter being responsive to the respective FIFO not being empty to provide a not-empty status flag, and the communications module being responsive to the not-empty status flag to enable at least one of the first and second master and slave devices to receive data on a respective data communications bus from the respective FIFO.

7. The data communications system of claim 1, further comprising:
an arbiter coupled to the multiplexer for arbitrating access to the memory device by the first and second data communications buses.

8. The data communications system of claim 1, wherein at least the first data communications bus operates in a format different from an operating data format of the communications module, the communications module further includes a first port coupled to the first data communications bus and a second port coupled to the second data communications bus, the first port being operable to transform data between the format of the first data communications bus and the format of the communications module.

9. A communications module for a data communications system having a plurality of data processors capable of communicating data, the communications module comprising:
A plurality of ports, each port arranged to be coupled to at least a respective one of the data processors, at least a first of the plurality of ports being coupled to at least a first data processor that operates in a first format and at least a second of the plurality of ports being coupled to at least a second data processor that operates in a second format that is incompatible with the first format, the second data processor having an address in the second format;
A memory device having a plurality of individually addressable locations for storing data from a transmitting data processor at an addressable location identified by a second address, each of the addressable locations being addressable by at least two of the data processors, at least one of the addressable locations being addressable by the first and second data processors,
An address table associated with each of the addressable locations for associating addresses of the respective addressable location to addresses of respective data processors, the address table being responsive to a first address to associate the second address and a third address to the first address, the first address being the address of a receiving first or second data processor in the format of the transmitting first or second data processor, the third address being the address of the receiving first or second data processor in the format of the receiving first or second data processor, and
A multiplexer responsive to the third address from a receiving first or second data processor for transmitting data between the location in the memory device identified by the second address and the respective receiving data processor.

10. The communications module of claim 9, wherein the memory device comprises:
a plurality of addressable first-in, first-out (FIFO) memories.

11. The communications module of claim 10, wherein the first data processor is operable to communicate data to the module for storage in a respective FIFO, the module further comprising:
a first counter coupled to each FIFO, the first counter being responsive to the respective FIFO not being full to provide a not-full status flag, and
the first port being responsive to the not-full status flag to enable the first data processor to transmit data for storage in the respective FIFO.

12. The communications module of claim 11, wherein the second data processor is operable to receive data stored in the respective FIFO, the module further comprising:
a second counter coupled to each FIFO, the second counter being responsive to the respective FIFO not being empty to provide a not-empty status flag, and
the second port being responsive to the not-empty status flag to enable the second data processor to receive data from the respective FIFO.

13. The communications module of claim 10, wherein the second data processor is operable to receive data stored in the respective FIFO, the module further comprising:
a second counter coupled to each FIFO, the second counter being responsive to the respective FIFO not being empty to provide a not-empty status flag, and
the second port being responsive to the not-empty status flag to enable the second data processor to receive data from the respective FIFO.

14. The communications module of claim 10, wherein the memory device includes a random access memory and a flag register.

15. The communications module of claim 9, further comprising:
an arbiter coupled to the multiplexer for arbitrating access to the memory device by the data processors.

16. The communications module of claim 13, wherein at least the first data processor operates in a format different from an operating data format of the module, each port coupled to a data processor that operates in a format different from the module being operable to transform data between the format of the respective data processor and the format of the module.

17. A process of communicating data between a first data communications device coupled to a first data bus operable to communicate in a first format and a second data communications device coupled to a second data bus operable to communicate in a second format, the second data communications device having an address in the second format, the first and second formats being incompatible, the process comprising steps of:
a) operating the first data communications device to transmit a first address to a communications module coupled as a slave device to each of the first and second data buses, the first address being an address of the second data communications device in the first format, the communications module having a plurality of individually addressable locations,
b) operating the first data communications device to transmit data to the communications module,
c) associating the first address to a second address that identifies an addressable location in the communications module,
d) storing the data at the addressable location in the communication module identified by the second address,
e) associating a third address to the first address, the third address being in the second format,
f) operating the second data communications device to transmit a request, using the third address, to the communications module to transmit data stored in the communication module at the addressable location identified by the second address, and
g) operating the communications module in response to receipt of the request to transmit data from the addressable location in the communication module to the second data communications device.

18. The process of claim 17, further including a step of:
   h) arbitrating use of the communications module by the first and second data communications devices.

19. The process of claim 18, wherein the first and second data communication devices each includes a bus having a plurality of master devices and a plurality of slave devices connected thereto.

20. The process of claim 17, wherein each of the first and second data buses comprises a plurality of master devices, at least one slave device and a bus arbiter arbitrating use of the respective data bus, wherein the communication module is operated as a slave device to both the first and second data buses.

* * * * *